F. W. SEECK.
GEARLESS DIFFERENTIAL POWER TRANSMISSION.
APPLICATION FILED AUG. 11, 1919.
1,388,069.
Patented Aug. 16, 1921.
2 SHEETS—SHEET 1.
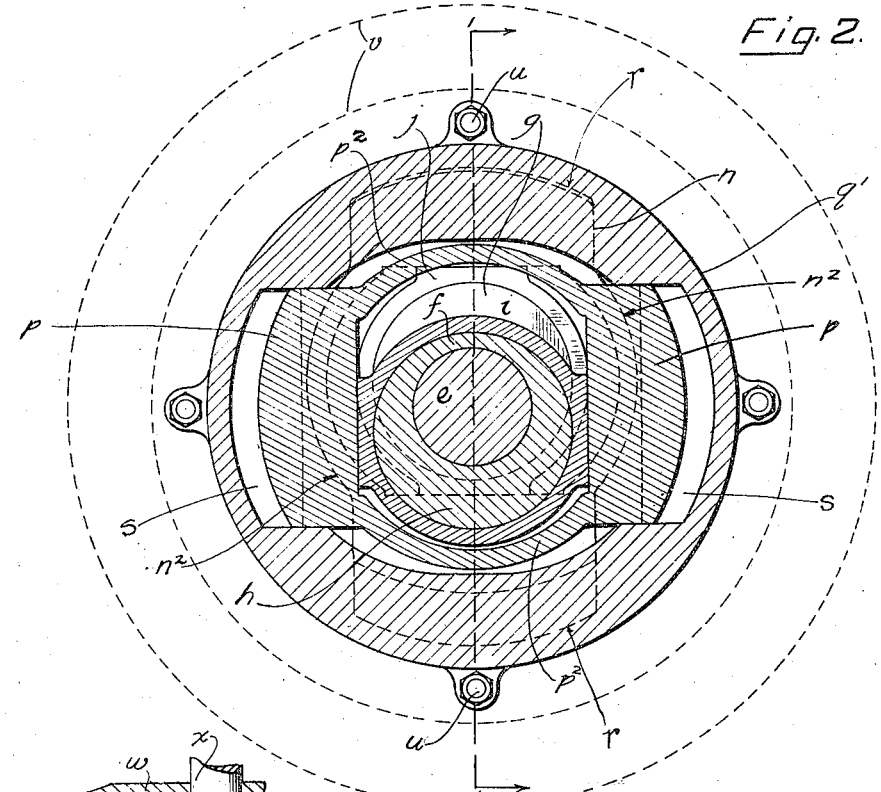
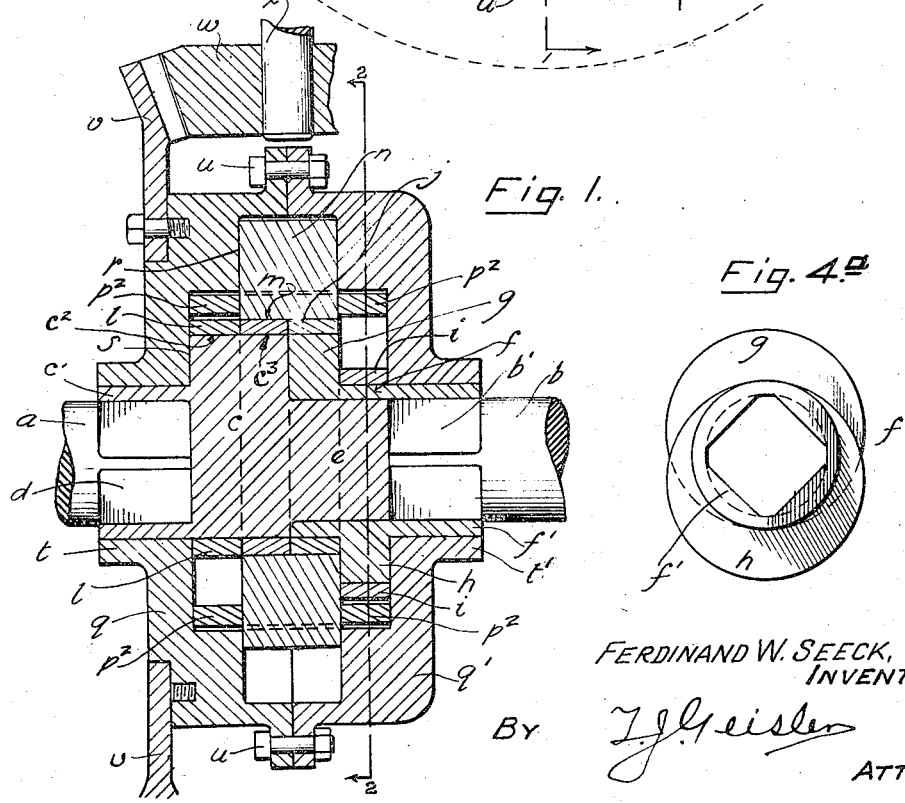
FERDINAND W. SEECK,
INVENTOR,
BY
ATTY.

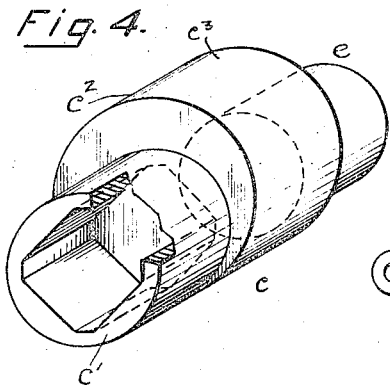
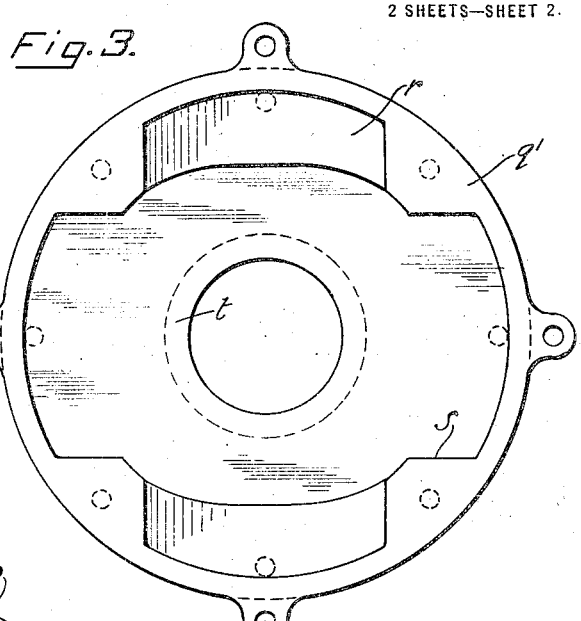
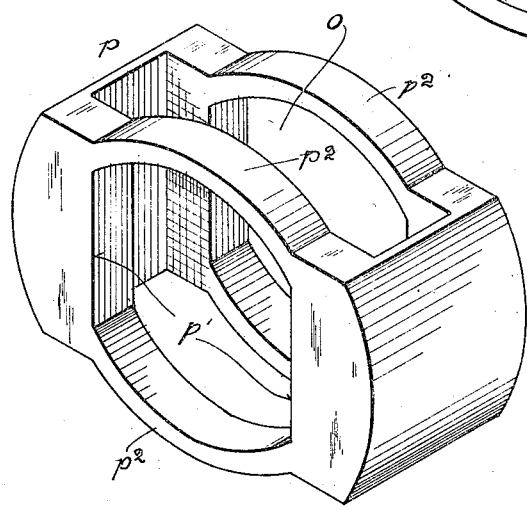
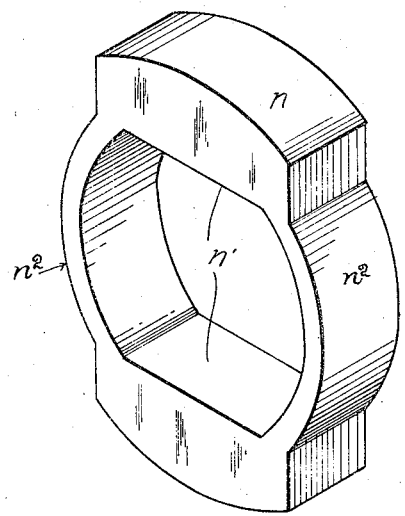
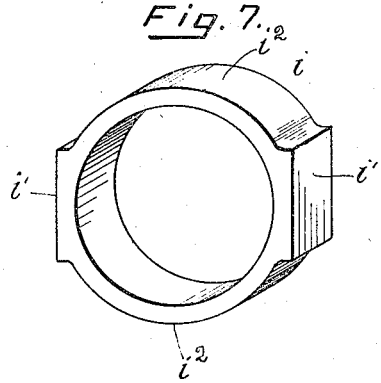

UNITED STATES PATENT OFFICE.

FERDINAND W. SEECK, OF LEBANON, OREGON.

GEARLESS DIFFERENTIAL POWER-TRANSMISSION.

1,388,069.          Specification of Letters Patent.    Patented Aug. 16, 1921.

Application filed August 11, 1919. Serial No. 316,893.

*To all whom it may concern:*

Be it known that I, FERDINAND W. SEECK, a citizen of the United States, and a resident of Lebanon, county of Linn, State of Oregon, have invented a new and useful Improvement in Gearless Differential Power-Transmission, of which the following is a specification.

My invention relates to the mechanism for driving the wheels of self-driving vehicles.

The object of my invention is to provide a simple gearless power transmitting mechanism, adapted to drive the sections of a divided axle simultaneously at the same rate, but at the same time permitting each of the axle-sections to have a relative different rate of rotation, as required in driving over curves in the road.

I attain my object in a mechanism comprising a driven differential case, a divided axle whose sections are journaled in the case, a crank-element on each axle-section, transmission-members reciprocating in the case on lines radial to the axis of rotation of the latter and perpendicular to each other, and devices mounted on the eccentric portions of said crank-elements, and reciprocating in said transmission members on lines perpendicular to the path of motion of the latter; whereby, during the driving of the differential case, the driving force is constantly transmitted to one or both of the sections of the divided axle, but either axle section is free to revolve at a relatively lesser rate, as required in running on the inside of a curve.

The construction and coöperation of the parts of my invention are illustrated in the accompanying drawings in which:

Figure 1 shows a section on the plane of the broken line 1—1 of Fig. 2, looking in the direction indicated by the arrows in which the ends of said line terminate.

Fig. 2 is a section on the plane of the broken line 2—2 of Fig. 1, looking in the direction indicated by the arrows at the ends of said line;

Fig. 3 is an interior view of one half part of the differential case;

Fig. 4 is a perspective of the cam-disk $c$;

Fig. 4ª is an end view of the cam disk $f$;

Fig. 5 is a perspective of the reciprocating member $p$;

Fig. 6 is a perspective of the reciprocating member $n$; and

Fig. 7 is a perspective detail of one of the rings mounted on the cam portions of said cam-disks, and bearing in said reciprocated members.

$a$, $b$, represent the sections of the divided axle of the rear wheels. The means for driving axle-sections consist of the following parts:

A crank-element $c$, having a cylindrical eccentric portion is made with an axial-socket $c'$, (see Fig. 4) adapted to receive the square-end $d$ of the axle-section $a$. Said crank-element also has an axial trunnion $e$ on which is rotatably mounted a hollow crank-element $f$, having opposite cylindrical eccentric portions $g$ and $h$. A right hand end view, with respect to Fig. 1, of the latter crank-element is shown in Fig. 4ª. The crank-element $f$ is made with an axial-socket $f'$ adapted to receive the square-end $b'$ of the axle-section $b$.

The eccentric portions of both of the crank elements $c$ and $f$ are substantially of the same length, so that the total length of the outer surface-sections $c^2$, $c^3$ of the integral eccentric portion, located on one side of the crank-element $c$, corresponds with the total length of the divided eccentric portions $g$, $h$, located on opposite sides of the crank-element $f$, and making a straight angle with each other.

On the outer eccentric-portion $h$ of the crank-element $f$ is mounted a ring $i$, whose perimeter consists of straight, parallel surfaces $i'$, and opposite, arcuate surfaces $i^2$. A perspective of this ring is shown in Fig. 7. On the outer surface $c^2$ of the eccentric portion of said crank-element $c$, is mounted a ring $l$, similar to the ring $i$. On the inner surface $c^3$ of the crank-element $c$, is mounted a ring $m$, and on the eccentric portion $h$ of the crank-element $f$, is mounted a ring $j$, the latter rings being similar to the ring $i$.

On the inner rings $j$, $m$, is loosely mounted a reciprocated transmission member *n* of which a perspective is shown in Fig. 6; and on the outer rings *l, i,* is loosely mounted a reciprocating transmission member *p* of which a perspective is shown in Fig. 5.

The transmission member *n* has parallel, straight inner sides *n'*, and opposite arcuate portions $n^2$, the chords of which are normal to said straight sides. The transmission member *p* also has parallel inner sides *p'* and opposite arcuate sides $p^2$. The straight sides of the rings *j* and *m* slide on the straight interior sides *n'* of the transmission member *n*, and reciprocate in the central opening of the latter, and in like manner, the straight exterior sides of the rings *l, i,* slide on the straight interior sides *p'* of the transmission member *p*. See Fig. 2. The transmission member *p* has a rectangular hollow *o*, in which the transmission member *n* slides. Thus said transmission members have a relative motion on lines at right angles to each other.

The transmission members *n* and *p*, are housed in the differential case, which is, for convenience, made with two parts *q, q'*, each part having a chamber *r*, constituting a guide-bearing for the transmission member *n*, and another chamber *s* constituting a guide-bearing for the transmission member *p*.

The case-part *q* has a hub *t*, made with an eye for receiving the axial socket *c'* of the crank-element *c*, and the case part *q'* has a hub *t'* made with an eye for receiving the axial socket *f'* of the crank-element *f*. The case parts are bolted together, as at *u*.

A ring-gear *v* is bolted to the case-part *q*, and meshes with a pinion *w* fast on the driving-shaft *x*.

The operation of my device is as follows:

Since, as apparent from Fig. 1 the adjacent inner eccentric portions $c^3$, *g*, of the two crank-elements *c* and *f* are both connected to the transmission member *n*, through the medium of the rings *m* and *j* and the outer portions $c^2$, and *h* of said crank-elements are both connected to the transmission member *p* through the medium of the rings *l* and *i*, and since said transmission members and said rings are restrained to move on lines radial to the axis of rotation and perpendicular to each other, therefore said eccentric portions of the crank-elements are held against angular displacement from each other; in other words the angle which they make with each other remains constant.

Hence, during the driving of the differential case, the driving force is constantly transmitted to one or both of the axle sections *a, b;* but one axle-section, due to relatively greater resistance of the ground—as when running on the inside of a curve—may revolve at a lesser rate, because in so doing it merely causes a relative displacement of the slidable parts, without changing their relations to the combined devices as a whole.

I claim:

1. A differential transmission mechanism comprising a driven case, a divided axle, whose sections are journaled in the case, a crank-element on each axle-section, transmission members reciprocable in the case on lines radial to the axis of rotation of the case and perpendicular to each other, and devices mounted on the eccentric portions of said crank-elements and reciprocating in said transmission-members.

2. A differential transmission mechanism comprising a driven case, a divided axle, whose sections are journaled in the case, a crank-element on each axle-section, each crank-element having cylindrical eccentric portions, transmission members reciprocable in the case on lines radial to the axis of rotation of the case and perpendicular to each other, and rings rotatably mounted on the eccentric portions of said crank-elements and reciprocable in said transmission members transversely to the line of motion of the latter.

3. A differential transmission mechanism comprising a driven case, a divided axle, whose sections are journaled in the case, a crank-element on each axle-section, one of said crank-elements having an axial trunnion and the other being rotatably mounted on the latter, transmission members reciprocable in the case on lines radial to the axis of rotation of the case and perpendicular to each other, and devices mounted on the eccentric portions of said crank-elements and reciprocating in said transmission-members.

4. A differential transmission mechanism comprising a driven case, a divided axle, whose sections are journaled in the case, a crank-element on each axle-section, each crank-element having cylindrical eccentric portions, one of said crank-elements having an axial trunnion and the other being rotatably mounted on the latter, said case having rectilineal guide elements normal to each other, a transmission-member reciprocably carried by each guide-element, and rings rotatably mounted on the eccentric portions of said crank-elements and reciprocable in said transmission members transversely to the line of motion of the latter.

5. A differential transmission mechanism comprising a driven case, a divided axle, whose sections are journaled in the case, a crank-element on each axle-section, the eccentric portions of the crank-elements being cylindrical and substantially of equal length, the eccentric portion of one crank-element being divided and located to make an angle with each other, said case having two guide-ways normal to each other, a transmission member sliding in each of said guide-ways, one of said transmission members sliding on the other, each of said transmission members being made with a central opening having parallel, straight interior sides, normal to the path of motion of the transmission member, and rings having straight, parallel exterior sides bearing on said interior sides of the transmission members and reciprocable in the central openings of the latter, said rings being mounted on the eccentric portions of said crank-elements.

6. A differential transmission mechanism comprising a driven case, a divided axle, whose sections are journaled in the case, a crank-element on each axle-section, the eccentric portions of the crank-elements being cylindrical and substantially of equal length, the eccentric portion of one crank-element being divided and located to make an angle with each other, one of said crank-elements having an axial trunnion and the other being rotatably mounted on the latter, said case having two guide-ways normal to each other, a transmission member sliding in each of said guide-ways, one of said transmission members sliding on the other, each of said transmission members being made with a central opening having parallel, straight interior sides, normal to the path of motion of the transmission member, and rings having straight, parallel exterior sides bearing on said interior sides of the transmission members and reciprocable in the central openings of the latter, said rings being mounted on the eccentric portions of said crank-elements.

7. A differential transmission mechanism comprising a driven case, a divided axle, whose sections are journaled in the case, a crank-element on each axle-section, the eccentric portions of the crank-elements being cylindrical and substantially of equal length, the eccentric portion of one crank-element being divided and located to make an angle with each other, one of said crank-elements having an axial trunnion and the other being rotatably mounted on the latter, said case having two guide-ways normal to each other, a transmission member sliding in each of said guide-ways, one of said transmission members having a rectangular hollow in which the other slides, each of said transmission members being made with a central opennig having parallel, straight interior sides, normal to the path of motion of the transmission member, and rings having straight, parallel exterior sides bearing on said interior sides of the transmission members and reciprocable in the central openings of the latter, said rings being mounted on the eccentric portions of said crank-elements.

FERDINAND W. SEECK.